United States Patent [19]

Steigelman et al.

[11] 4,228,214
[45] Oct. 14, 1980

[54] FLEXIBLE BILAYERED SHEET, ONE LAYER OF WHICH CONTAINS ABRASIVE PARTICLES IN A VOLATILIZABLE ORGANIC BINDER AND THE OTHER LAYER OF WHICH CONTAINS ALLOY PARTICLES IN A VOLATILIZABLE BINDER, METHOD FOR PRODUCING SAME AND COATING PRODUCED BY HEATING SAME

[75] Inventors: James Q. Steigelman, Athens; Roger B. Bargainnier, Towanda, both of Pa.; Glenn A. Shaffer, deceased, late of Towanda, Pa.; by Irene S. Charland, administrator DBN CTA, New Albany, Pa.; Geoffrey L. Harris, Monroeton, Pa.

[73] Assignee: GTE Products Corporation, Stamford, Conn.

[21] Appl. No.: 882,076

[22] Filed: Mar. 1, 1978

[51] Int. Cl.³ .................. B32B 5/22; B32B 15/02; B32B 15/08; B32B 15/16; B32B 27/04

[52] U.S. Cl. ................. 428/212; 156/244.22; 156/244.24; 156/244.27; 156/246; 427/196; 427/201; 427/383.9; 428/213; 428/215; 428/216; 428/217; 428/327; 428/328; 428/334; 428/335; 428/339

[58] Field of Search ............... 156/62.2, 62.8, 244.22, 156/244.24, 244.27, 246; 427/196, 201, 383 D; 428/212, 213, 215, 216, 217, 327, 328, 334, 335, 339, 551, 560, 639, 680, 686

[56] References Cited

U.S. PATENT DOCUMENTS 3,743,556   7/1973   Breton et al. ................ 156/62.8

*Primary Examiner*—James C. Cannon
*Attorney, Agent, or Firm*—John C. Fox

[57] ABSTRACT

A flexible sheet of a top layer of nickel brazing alloy particles overcast on a tapecast base layer of tungsten carbide particles, the brazing alloy particles and carbide particles each dispersed in and supported by an organic binder matrix, when placed on a substrate dewaxed and heated to about 1100° C., forms a braze infiltrated hardfacing coating of tungsten carbide particles in a braze alloy matrix, which coating is metallurgically bonded to and enhances the hardness and wear resistance of the coated substrate.

22 Claims, 3 Drawing Figures

FLEXIBLE BILAYERED SHEET, ONE LAYER OF WHICH CONTAINS ABRASIVE PARTICLES IN A VOLATILIZABLE ORGANIC BINDER AND THE OTHER LAYER OF WHICH CONTAINS ALLOY PARTICLES IN A VOLATILIZABLE BINDER, METHOD FOR PRODUCING SAME AND COATING PRODUCED BY HEATING SAME

BACKGROUND OF THE INVENTION

1. FIELD OF THE INVENTION:

This invention relates to a flexible bilayered sheet of a base layer containing abrasive particles and a top layer containing metal or alloy matrix particles, a method for producing same, and a single layer composite coating produced therefrom.

2. PRIOR ART:

U.S. Pat. No. 3,743,556 teaches the production of coatings of abrasive metal particles in a metal or alloy matrix by contacting the substrate to be coated with a laminate of a base layer of abrasive particles in a voltilizable support such as polytetrafluoroethylene and an upper layer of matrix metal or alloy particles in a similar volatilizable support. Upon heating above the volatilization point of the support material, the support material is removed, and upon subsequent heating above the melting point of the matrix metal or alloy particles, the molten metal infiltrates the abrasive layer to form the desired "filled coating".

Advantages over the prior art coating techniques are said to include uniformity of coating, especially on a substrate having an intricate surface, and the avoidance of alternative methods such as plasma spraying, flame spraying, or dusting of abrasive and metal particles on the substrate to be coated.

The laminate layers are produced in accordance with the teachings of the patent either by mechanical working of a mixture of the particles with the polytetrafluoroethylene particles in order to fibrillate the polytetrafluoroethylene particles and to interleave the fibrils, followed by passing the worked mixture through pressure rolls spaced to produce a sheet of desired thickness. Alternatively, such layers are produced in accordance with the teachings of the patent by mixing the particles with shellac, polymethacrylate, polyacrylate or the like, and forming the resulting fluid mixture into a layer such as by doctoring directly onto the substrate to be coated.

While the first technique is advantageous in that it produces self-supporting sheets or layers, it is time consuming in requiring mechanical working and feeding through pressure rolls in order to form the layers or sheets. The second technique avoids the necessity for such processing steps, but does not enable the production of self-supporting sheets or layers. On the contrary, such layers must be formed directly on the substrate to be coated, and consequently a major advantage of the achievement of uniformity of coating on intricate surfaces is lost.

SUMMARY OF THE INVENTION

In accordance with the invention, there is provided a flexible self-supporting bilayered sheet or tape of a layer of matrix metal or alloy particles over a layer of abrasive particles, the matrix and abrasive particles both dispersed in and supported by an organic binder matrix comprising from about 53 to 58.5 weight percent of polyvinyl butyral, 39.5 to 43.8 weight percent of a phthalate plasticizer which is at least partially compatible with polyvinyl butyral, such as diocytl phthalate, and 2.0 to 2.7 weight percent of a deflocculant, for example fishoil. The melting point of the matrix particles is greater than the volatilization temperature of the organic binder, but less than the melting point of the abrasive particles.

Further in accordance with the invention, such flexible self-supporting bilayered sheet or tape is formed by a process comprising first forming slurries of the particles and organic binder in an organic solvent, wherein the solvent comprises from about 55 to 75 weight percent of the organic portion, followed by tape casting the slurry containing the abrasive particles to form a base layer, and then overcasting the slurry of matrix particles to form the bilayered sheet.

The invention further includes a composite coating of the abrasive particles distributed in and supported by a metal or alloy matrix, the coating produced by contacting the substrate to be coated with the bilayered sheet or tape, and heating to above the melting point of the matrix metal or alloy, but below the melting point of the abrasive particles, in order to cause removal of the organic binder and infiltration of the abrasive particle layer by the molten metal or alloy and contact of the substrate by the molten matrix metal or alloy.

Since coatings find a variety of applications, but are particularly useful as hard and/or wear resistant coatings on wear surfaces.

DETAILED DESCRIPTION OF THE INVENTION

Figure 1:
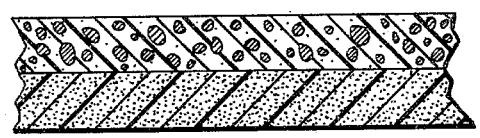
FIG. 1 is a section view of a bilayered flexible tape 10 of the invention, comprising base layer 11 of abrasive particles in an organic binder matrix and top layer 12 of metal or alloy particles in a similar organic binder matrix.
Figure 2:
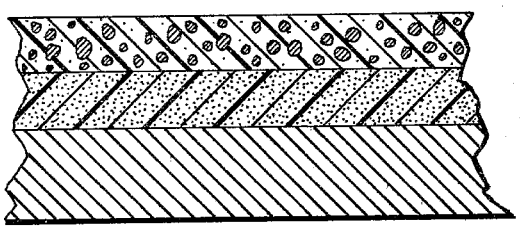
FIG. 2 is a section view of the bilayered tape of FIG. 1 placed upon the surface of a substrate to be coated.
Figure 3:
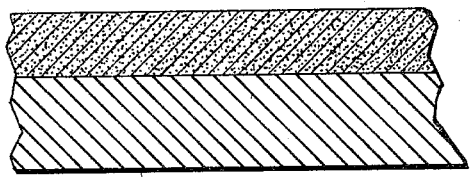
FIG. 3 is a section view of the coated substrate after heating to remove the organic binder and cause infiltration of the molten top layer particles into the base layer to form a matrix for the abrasive particles in the base layer.

In a preferred embodiment, the abrasive particles in the base layer are a carbide, for example tungsten carbide, and the particles in the top layer are a braze alloy, such as a nickel base self-fluxing alloy. Such tape or sheet is useful for example, in forming hardfacing coatings on metallic wear surfaces. The detailed description will largely be in terms of such preferred embodiment.

Fine particle size tungsten carbide powder, that is, less than about 15 microns and preferably less than about 2 microns average particle size as measured by Fisher Sub Sieve Sizer (FSSS), is preferred as the starting material for the base layer, since such material tends to enhance hardness, adherence and wear resistance of the resulting coatings. The particle size of the braze powder may be somewhat larger, since such particles lose their identity during the braze infiltrating step. Of course, such particle size should not exceed the desired overall thickness of the layer, and preferably should not exceed about 50 to 75 percent of the thickness of the layer.

The top and base layers are preferably formed by tape casting a slurry of the particles in an organic solution of the binder materials in a solvent. The solvent comprises about 55 to 75 weight percent, and preferably 60 to 70 weight percent of the total weight of the solution.

The tape casting slurries for the base and top layers are formed by adding the particles to the solution, in an amount to generally comprise from about 65 to 90 weight percent of the total weight of the slurry for the tungsten carbide particles and the braze alloy particles. The slurries are then milled under conditions to prevent the loss of solvent and to achieve a substantially unagglomerated particulate product in which the individual particles are coated with the binder. The bilayered sheet or tape is preferably formed by first tape casting the base layer, in a thickness of from about 1.5 to 50 mils, and then, after substantially complete drying of the base layer, overcasting the top layer, although the bilayered tape may also be formed by tape casting the base and top layers individually and then laminating the layers such as by passing them through pressure rolls. The top layer thickness is generally from 1 to 1.2 times the base layer thickness.

Upon drying by removal of the solvent, the carbide and braze alloy particles comprise about 80 to 97 weight percent of the total weight of the layers.

In forming a coating, the bilayered tape or sheet is first placed on the surface of the substrate to be coated, and the assembly is then subjected to slow heating in a protective (nonoxidizing) atmosphere such as hydrogen, dissociated ammonia or vacuum to remove the organic binder, and then quickly heated to a temperature above the melting point of the braze alloy so that the braze alloy particles melt and flow into the carbide powder network and contact the substrate to form an integral adherent bond to the substrate. Typically, the assembly is dewaxed by heating from room temperature to about 375° C. to 500° C. over a period of about 1 to 2 hours, and held at 375° C. to 500° C. for about 1 to 2 hours in order to remove the organic binder. Where the brazing alloy is a self-fluxing alloy of the type typically containing about 4.3 to 4.5 weight percent silicon, about 2.75 to 2.95 weight percent boron about 0.74 to 0.75 weight percent iron, about 0.016 to 0.024 weight percent carbon, less than about 0.039 to 0.10 cobalt, balance substantially nickel, the assembly is then quickly heated to a temperature of at least about 1100° C., typically about 1100° C. to 1200° C. for about 5 to 15 minutes, in order to achieve braze infiltration and bonding to the substrate.

EXAMPLE

A solution of organic binder in organic solvent having the following composition was formed.

TABLE I

| 258 ml | Dioctyl Phalate (D.O.P.) |
| 15 ml | Fish oil |
| 250 ml | Methyl Alcohol |
| 900 ml | Toluene |
| 345 gms | Polyvinyl Butyral |

The mixture was formed with a laboratory blender and roll milled for one-half hour. To 300 ml of this solution was added 1000 gms of a self-fluxing alloy having the approximate composition in weight percent, 4.34 silicon, 2.76 boron, 0.024 carbon, 0.75 iron, less than 0.039 cobalt, balance nickel, having a FSSS of between 44 and 84 microns. The slurry was milled with 350 gms of tungsten carbide milling media for one day on a roll mill in a sealed container to prevent the loss of solvent. A second slurry was formed by adding 2000 gms of tungsten carbide powder having an average particle size of 0.9 to 1.4 microns as measured by FSSS, to 600 ml of the binder solution. The slurry was milled with 700 gms of tungsten carbide milling media for three days on a roll mill in a sealed container. From the resulting slurries, base and top tape cast layers approximately 30 and 32 mils thick, respectively, were formed, with the layer containing the self-fluxing alloy particles being overcast on the tungsten carbide particle layer to achieve a bilayer laminate having a total thickness of about 62 mils.

The bilayered sheet was then placed upon a steel surface, and the assembly dewaxed by heating from room temperature to about 400° C. in hydrogen over a period of about two hours, and then quickly heated to about 1100° C. by placing the assembly in a furnace at this temperature and held at this temperature for about 10 minutes, and then cooled.

If the heating rate to the intermediate temperature is too rapid, the sheet or tape could tend to form cracks or blisters resulting from the too rapid volatilization of the binder. If the heating rate to the melting point of the brazing alloy is too slow, melting becomes difficult to achieve apparently due to the loss by volatilization of boron and consequent increase in the melting point of the alloy.

Diamond pyramid hardnesses of the resulting coatings were obtained and compared to the hardness values of coatings obtained using a bilayered sheet of the prior art, in which the abrasive particles were particles of cemented tungsten carbide, that is, WC particles in a cobalt binder matrix. The brazed alloy was substantially identical to that used in the bilayered tape of the invention. Results are shown in Table II.

TABLE II

| Sample No. | Coating of The Prior Art | Coating of The Example |
|---|---|---|
| | DPH | |
| 1 | 1076 | 1285 |
| 2 | 1004 | 1207 |
| 3 | 945 | 1080 |

Taking the average DPH hardness values for the prior art coating and coating of the Example, a greater than 12% increase in DPH hardness is demonstrated.

While there has been shown and described what are at present considered the preferred embodiments of the invention, it will be obvious to those skilled in the art that various changes and modifications may be made therein without departing from the scope of the invention as defined by the appended claims.

What is claimed is:

1. A self-supporting flexible bilayered sheet comprising a base layer and a top layer, the base layer comprising abrasive particles distributed in and supported by a volatilizable organic binder matrix, the top layer comprising metallic matrix particles distributed in and supported by a volatilizable organic binder matrix, the matrix particles having a melting point greater than the volatilization temperature of the organic binder, but less than the melting point of the abrasive particles, characterized in that said binder comprises from about 53 to 58.5 weight percent of polyvinyl butyral, 39.5 to 43.8 weight percent of a phthalate plasticizer and 2.0 to 2.7 weight percent of a deflocculant.

2. The bilayered sheet of claim 1 wherein the abrasive particles comprise a carbide composition.

3. The bilayered sheet of claim 2 wherein said carbide particles consist essentially of tungsten carbide.

4. The bilayered sheet of claim 3 wherein the average particle size of the tungsten carbide particles is less than 15 microns.

5. The bilayered sheet of claim 4 wherein the average particle size of the tungsten carbide particles is less than 2 microns.

6. The bilayered sheet of claim 1 wherein the metallic matrix particles comprise a braze alloy composition.

7. The bilayered sheet of claim 6 wherein the braze alloy consists essentially of nickel base self-fluxing alloy.

8. The bilayered sheet of claim 1 wherein the thicknesses of the top and base layers range from 1.5 to 50 mils.

9. The bilayered tape of claim 1 wherein the thickness ratio of the top layer is within the range of 1 to 1.2.

10. The bilayered sheet of claim 2 wherein the carbide is present in the amount of from about 80 to 97 weight percent of the total weight of the base layer.

11. The bilayered sheet of claim 4 wherein the braze alloy is present in the top layer in the amount of from about 80 to 97 weight percent of the total weight of the layer.

12. A method for forming a self-supporting flexible bilayered sheet comprising a base layer and a top layer, the method comprising:
(a) forming a solution of an organic binder in an organic solvent, the binder comprising from 53 to 58.5 weight percent of polyvinyl butyral, 39.5 to 43.8 weight percent of a phthalate plasticizer and 2.0 to 2.7 weight percent of a deflocculant;
(b) forming first and second slurries of abrasive particles and metallic matrix particles in said solution, respectively;
(c) tape casting said first and second slurries;
(d) removing the organic solvent from the tape cast layers to leave first and second flexible self-supporting sheets; and
(e) attaching the second sheet to the top of the first sheet to form a flexible self-supporting bilayered sheet.

13. The method of claim 12 wherein the second sheet is attached to the top of the first sheet by overcasting the second slurry on to the top of the first sheet.

14. The method of claim 12 wherein the abrasive particles comprise a carbide composition.

15. The method of claim 14 wherein said carbide particles consist essentially of tungsten carbide.

16. The method of claim 15 wherein the average particle size of said tungsten carbide particles is less than 15 microns.

17. The method of claim 16 in which the average particle size of said tungsten carbide particles is less than 2 microns.

18. The method of claim 12 in which the metallic matrix particles comprise a braze alloy composition.

19. The method of claim 18 wherein said braze alloy composition consists essentially of a nickel based self-fluxing alloy.

20. The method of claim 12 in which the solvent is present in the solution in the amount of about 55 to 75 weight percent of the total weight of the solution.

21. The method of claim 14 wherein the carbide particles are present in the amount of 65 to 90 weight percent of the total weight of the slurry.

22. The method of claim 16 wherein the braze alloy particles are present in the amount of about 65 to 90 weight percent of the total weight of the slurry.

* * * * *